Sept. 6, 1932.    D. S. WEISS    1,875,969
DRAWBAR APPARATUS FOR TRAILERS
Filed March 20, 1931    2 Sheets-Sheet 1
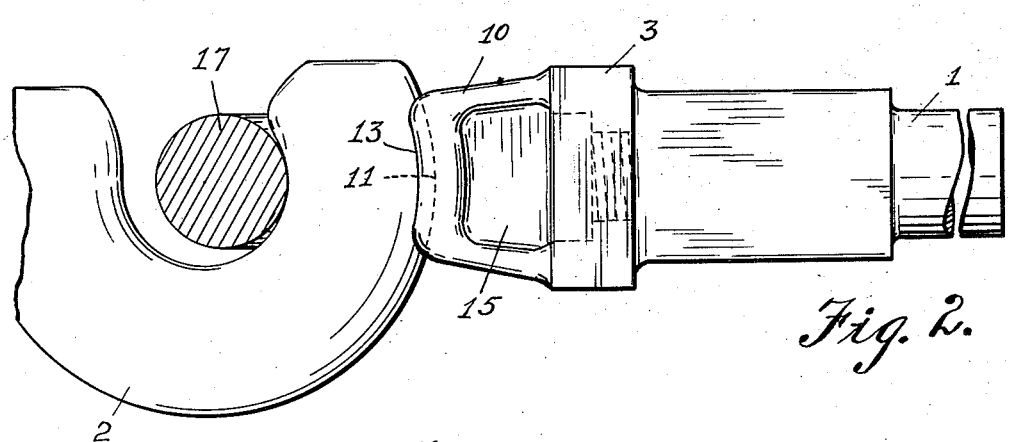
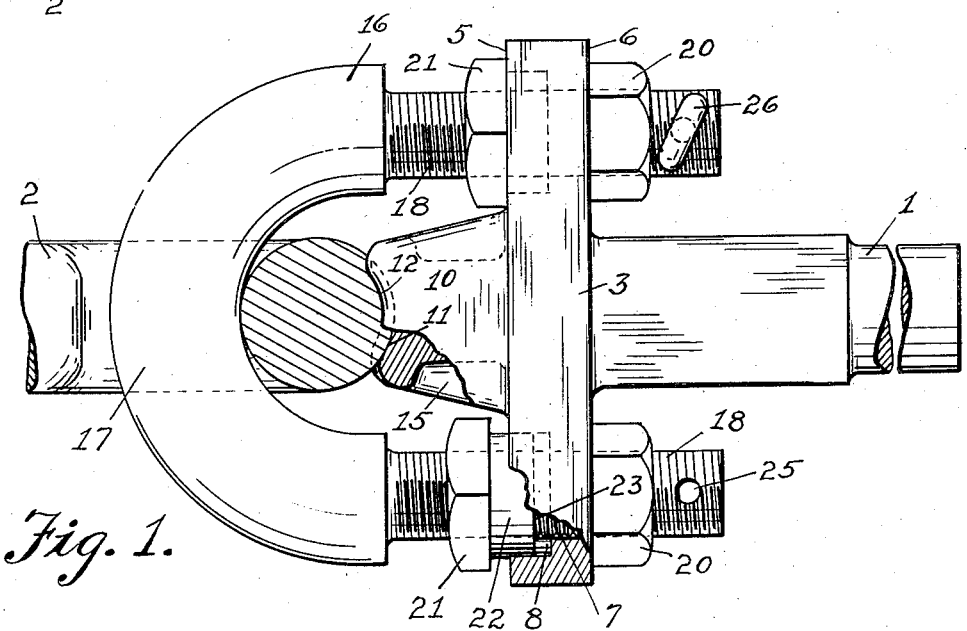
Inventor,
DEWEY S. WEISS,
By Horace Barnes,
his Attorney.

Sept. 6, 1932.    D. S. WEISS    1,875,969
DRAWBAR APPARATUS FOR TRAILERS
Filed March 20, 1931    2 Sheets-Sheet 2

INVENTOR,
DEWEY S. WEISS,
By Horace Barnes,
his ATTORNEY.

Patented Sept. 6, 1932

1,875,969

UNITED STATES PATENT OFFICE

DEWEY S. WEISS, OF PORTLAND, OREGON

DRAWBAR APPARATUS FOR TRAILERS

Application filed March 20, 1931. Serial No. 524,031.

This invention relates to improvements in coupling devices for automobile trailers, and particularly to the novel construction and arrangement of the draw-bar connections with the draft-apparatus of the propelling truck.

The object of my invention is the provision of connecting apparatus upon the extremity of the trailer draw-bar of simple and practicable construction which will be readily adjustable to fit any suitable draft-hook or coupling device upon the truck and which will admit of free relative swinging or turning movements between the connections without lost motion or looseness in such connections.

Other objects and advantages residing in my invention, and objects relating to details of construction thereof, will be readily apparent in the course of the detailed description to follow.

The accompanying drawings illustrate by way of example a representative form of my invention, in which:

Figure 1 is a fragmentary view of a trailer-draw-bar and my improved adjustable eye therefor shown as attached to the draft-hook of a truck, said eye being shown partly in section and partly in side elevation.

Fig. 2 is a top plan view of the same, shown broken away in parts to disclose the inner construction thereof.

Figure 4:
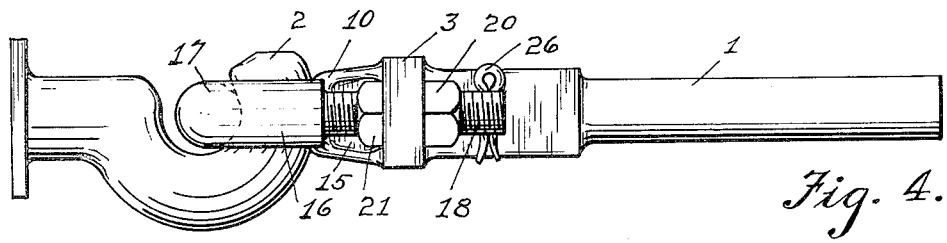
Fig. 4 is a view in side elevation of the draw-bar apparatus in operative connection with a draft-hook of a truck.
Figure 3:
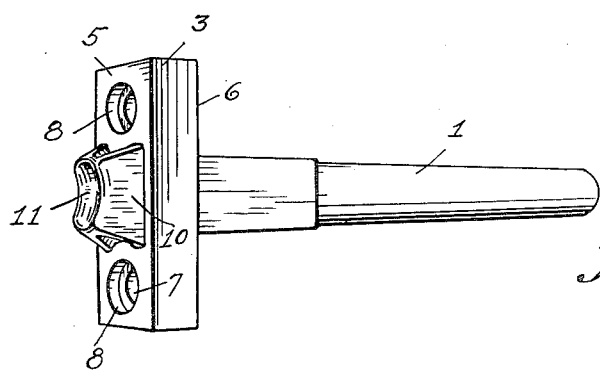
Fig. 3 is a perspective view of the outer end of the draw-bar with the yoke-bolt removed, said view being drawn to a smaller scale than the previous views.

Referring to said views, the reference numeral 1 indicates the tongue or draw-bar of a wheeled trailer, not shown, adapted for detachable connection with a draft-hook 2 rigidly mounted at the rear of a truck, not shown, and through which the trailer is propelled in a well-known manner. Said drawbar is provided or formed with a T-head 3 at its outer extremity which is of considerable thickness of metal disposed symmetrically at right angles to the axis of the draw-bar. Said head is desirably formed with front and rear faces 5 and 6, respectively, in parallel planes disposed perpendicularly to the said axis of the bar. At each end thereof said head is formed with a circular bolt-
aperture 7 extending therethrough with axes in parallel with said bar at the front end of each said aperture. Said apertures are counterbored, as at 8, to provide an enlarged opening in the front face 5.

Intermediate said apertures an integral block 10 is formed extending forwardly from the front face of the head and arranged symmetrically with the end of the draw-bar. Said block is formed with a recessively curved hook-seat 11 at its foremost extremity, said seat having a substantially spherical or compound curvature within which the usually rotund form of the draft-hook 2 may seat. To facilitate the accommodation of draft-hooks of any practicable dimensions and admit the swing of the draw-bar thereabout either in vertical or lateral directions the outer end of said block is formed upon its upper and lower edges about said seat with re-entrant curvatures 12, and upon the lateral sides with similar curvatures 13. Upon each of said lateral sides of the block it is formed with a recess 15 to afford convenient space about the adjustment nuts, to be presently described, to conveniently work a wrench.

A yoke-bolt 16 is provided consisting in a median curved portion 17 of substantially semi-circular configuration and cylindrical cross-section, and in two integral bolt-portions 18 of reduced diameters. Said bolts are screw-threaded throughout their lengths and are extended in parallel spaced relation to protrude through the apertures 7 in said draw-bar head. Common screw-nuts 20 are provided to screw upon said bolts at their outer ends and to bear upon the inner faces 6 of the head. Other special nuts 21 are screwthreaded upon said bolts between the head and the curved portion 17 of the yoke-bolt, which nuts are each formed with an integral barrel 22 adapted to enter the counterbored portion 8 of the apertures 7 with their bottom edges 23 seated against the bottom of said counterbores. Apertures 25 may be formed in the extremities of the bolts 18 to receive cotter-pins 26 for safeguarding the nuts 20.

The manner of assembling my improved draw-bar apparatus and the method of attaching the same to a draft-hook of a truck will be clearly apparent from the foregoing description taken with the drawings. It will be seen that with the nuts loosened on the bolts from contact with the head 3 that the opening between the block 10 and the middle portion 17 of the yoke-bolt may be adjusted to receive the hook 2 and position the hook to seat squarely in the seat 11. The nuts 20 are then screwed upon the bolts 18 to bear firmly upon the rear face of the head and to draw the yoke-portion 17 and the block-seat 11 together and to retain the hook reliably therebetween in as firm and close connection as desired.

When thus connected full play is provided for the necessary or desirable relative swinging movements between the trailer and the truck while all slack or unnecessary looseness may be taken up to prevent undue jerks and wear of the parts.

The apparatus is simple and strong in construction and is particularly adapted for the purposes intended.

Having described my invention, what I claim, is:

1. A trailer connection to trucks, consisting in combination with a draft-hook of a truck, said hook being circular in cross-section, of a draw-bar secured at one end to a trailer and having a T-head at its opposite end formed with a pair of spaced apertures therethrough, a U-shaped member having a pair of parallel, spaced threaded bolts adapted to extend through said apertures, and nuts threaded on each said bolt upon opposite sides of said T-head to provide a closely adjustable connection with said draft-hook between said U-bolt and the T-head.

2. The trailer connective apparatus as set forth in claim 1, wherein a block is formed integrally upon the forward face of the T-head having an concavity therein between which and the middle portion of the U-bolt the draft-hook of the truck is received.

3. Trailer connections to trucks, consisting in combination with a draft-hook of a truck, of a draw-bar secured at one end to a trailer and at its opposite end formed with a T-head provided with an aperture at each end disposed in parallel with said draw-bar, said apertures being counterbored at their forward ends, a U-shaped member formed with a pair of integral screw-threaded bolts arranged to extend through said apertures, respectively, and nuts threaded upon said bolts to bear upon opposite sides of said T-head, the forward of said nuts being formed to bear upon the bottom of the respective said counterbores.

4. The trailer connective apparatus as set forth in claim 3, wherein a block is formed integrally upon the forward face of the T-head having a recessively curved forward face to receive the draft-hook of the truck.

5. The trailer connective apparatus as set forth in claim 1, wherein a block is formed integrally upon the forward face of the T-head having a concavity upon its forward face and re-entrantly curved edges upon the upper and lower edges of said concavity and upon its opposite lateral sides.

DEWEY S. WEISS.